United States Patent [19]
Biddulph

[11] 3,952,945
[45] Apr. 27, 1976

[54] FURNACE TEMPERATURE CONTROL SYSTEM

[75] Inventor: Richard Hampton Biddulph, Worcester Park, England

[73] Assignee: United States Borax & Chemical Corporation, Los Angeles, Calif.

[22] Filed: Nov. 18, 1974

[21] Appl. No.: 524,839

[30] Foreign Application Priority Data
Nov. 16, 1973 United Kingdom............... 53278/73

[52] U.S. Cl............................. 236/15 B; 219/491; 236/46 R
[51] Int. Cl.².................... G05D 23/22; F23N 1/00
[58] Field of Search...................... 236/15 B, 46, 78; 219/491; 266/5 T; 13/24

[56] References Cited
UNITED STATES PATENTS
| | | | |
|---|---|---|---|
| 2,118,642 | 5/1938 | Flynn et al........................ | 236/46 X |
| 3,127,498 | 3/1964 | Gould et al...................... | 219/491 X |
| 3,370,120 | 2/1968 | Lasch et al....................... | 236/15 B |

Primary Examiner—William E. Wayner
Attorney, Agent, or Firm—James R. Thornton

[57] ABSTRACT

Temperature control system for furnaces used in heat-treating metallic articles, such as boronizing steel.

5 Claims, 2 Drawing Figures

FURNACE TEMPERATURE CONTROL SYSTEM

This invention relates to furnaces, particularly to furnaces which are employed for heat treating metallic or non-metallic articles whereby the articles are coated with a metal or inorganic compound or whereby a metal or inorganic compound diffuses into the article's surface.

In the well known processes for the surface diffusion of an element into an article such as boronizing steel, the article is buried in a pack consisting of a source of the element and an activator. The pack is then maintained at an elevated temperature in a furnace until the desired diffusion has taken place. The steel article or articles are placed within a pack consisting of an intimate mixture of boron souce, such as boron carbide, and an activator, such as an alkali metal fluoride or fluoborate. The pack, in its container, is placed in a furnace and heated to a suitable temperature such as about 900°C. which is maintained until boron has diffused into the surface of the steel to the desired level. This process may take several hours. Hitherto it has been necessary to run furnaces for long periods at the treatment temperature before the desired temperature of the article or articles are attained since the pack itself is an effective thermal insulator. Further, if higher furnace temperatures are employed and the temperature of the article or articles cannot be steadily maintained, adverse effects to the process will be encountered.

It is therefore an object of the present invention to provide a control system for a furnace whereby an article or articles, which are insulated from the surroundings, may be rapidly heated to a predetermined temperature and maintained at that temperature for a preset time.

Another object of the present invention is to provide a furnace with which an article or articles can be automatically heated-treated by the aforesaid processes. Accordingly, the present invention provides a furnace heating and control system which comprises a furnace heating means; a first temperature controller set to a temperature above the required treatment temperature, and connected to a first means, for measuring the temperature of the furnace atmosphere, and to the heating means; a second temperature controller, set to a temperature below the required treatment temperature, and connected to a means for measuring the temperature of an article being treated and via a timing mechanism and a change-over relay, adapted to change control of the heating means from the first temperature controller to a third temperature controller, to the heating means; and a third temperature controller, set to the required treatment temperature, and connected to a second means, for measuring the temperature of the atmosphere of the furnace, and to the heating means. Preferably, the first temperature controller is set to a temperature just below the maximum operating temperature of the furnace.

The preferred control system of the invention consists of three thermocouples connected to pyrometer controllers of any type that causes the output to switch off when the set temperature is exceeded. There is also a timer which is set to switch off after treatment time. The control system may be fitted to any known type of furnace, although those which are electrically heated are preferred.

The invention is further illustrated by the accompanying drawing, wherein.

Figure 1:
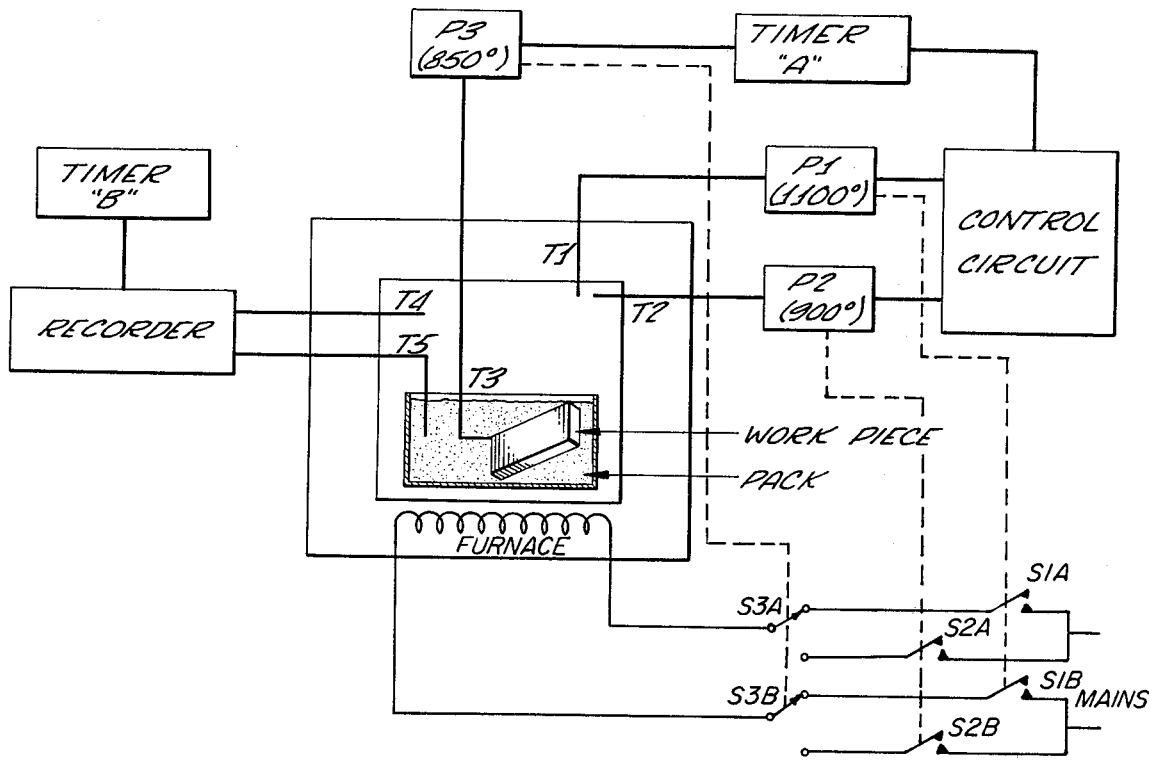
FIG. 1 is a diagram showing the control system of the present invention.

In FIG. 1 pyrometers $P_1$, $P_2$ and $P_3$ are connected respectively to thermocouples $T_1$, $T_2$ and $T_3$. Thermocouples $T_1$ and $T_2$ are located in the general atmosphere of the furnace and thermocouple $T_3$ is buried in the pack next to the article or articles to be treated. Timer A is preset to switch off after the treatment period has elapsed. The furnace is heated by means of a coil controlled by a series of switches. Switches S1A and S1B are operated by temperature controller P1. S2A and S2B are operated by temperature controller P2. S3A and S3B are operated by temperature controller P3.

Two further thermocouples, $T_4$ located in the furnace atmosphere and $T_5$ located in the pack can be attached to a two-point recorder so that a complete record of the treatment is obtained. A second timer B can be used to economize in chart if the equipment is left running overnight.

Figure 2:
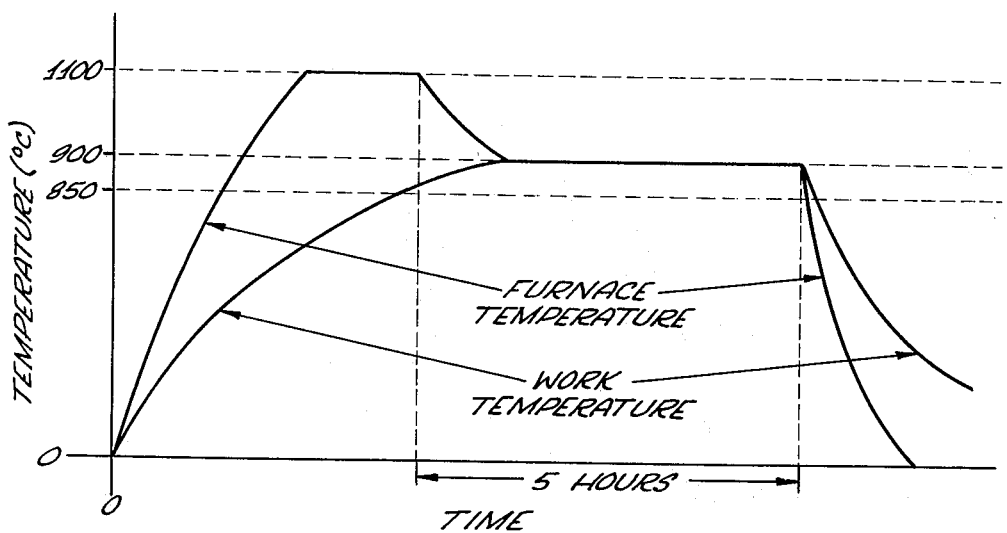
FIG. 2 is a graph showing the relationship between time and the temperature of the furnace and the temperature of the pack.

FIG. 2 is a graph showing the temperature attained in the furnace atmosphere and the pack during the time the furnace is in operation.

The invention is further illustrated by the following Example.

EXAMPLE

In this example, $P_1$ was set to 1100°C., $P_2$ was set to 900°C. (the desired treatment temperature) and $P_3$ was set to 850°C. and A was set to 5 hours.

The furnace was switched on and the heating elements were under the control of $P_1$ until $T_3$ attained a temperature of 850°C. when the control was switched to $P_2$ and the timer clock was started. The ambient temperature of the furnace was 1100°C. and the heater was switched off until the temperature fell to 900°C. which was then maintained. Meanwhile, the temperature of the article rose to a temperature of 900°C. at which it was maintained for the timing period. At the end of that period, the furnace automatically shut down. The total time taken using a particular furnace was 8.5 hours. For comparison, if simple control at 900°C. is used with the same furnace, the total time for an equivalent diffusion layer was 12.1 hours. Thus, there is a saving in time of 3.6 hours and incidentally, a 16 percent saving in energy consumed.

Various changes and modifications of the invention can be made and, to the extent that such variations incorporate the spirit of this invention, they are intended to be included within the scope of the appended claims.

What is claimed is:

1. A furnace heating and control system which comprises a furnace heating means;

a first temperature controller, set to a temperature above the required treatment temperature, and connected to a first means for measuring the temperature of the furnace atmosphere, and to the heating means;

a second temperature controller, set to a temperature below the required treatment temperature, and connected to a means for measuring the temperature of an article being treated and via a timing mechanism and a change-over relay, adapted to change control of the heating means from the first temperature controller to a third temperature controller, to the heating means; and a third temperature controller, set to the required treatment temperature, and connected to a second means, for measuring the temperature of the furnace atmosphere, and to the heating means.

2. A furnace heating and control system in accordance with claim 1, wherein the first temperature controller is set to a temperature just below the maximum operating temperature of the furnace.

3. A furnace heating and control system in accordance with claim 1 wherein the timing mechanism starts when the second temperature controller comes into operation and switches off all power to the heating means when a predetermined time has elapsed.

4. A furnace heating and control system in accordance with claim 1 wherein the temperature controllers are pyrometers.

5. A furnace heating and control system in accordance with claim 1 wherein the means for measuring temperature are thermocouples.

* * * * *